Aug. 18, 1931.  B. A. WATT  1,819,578
POWER LOADING DUMP WAGON
Filed June 28, 1930   4 Sheets-Sheet 4
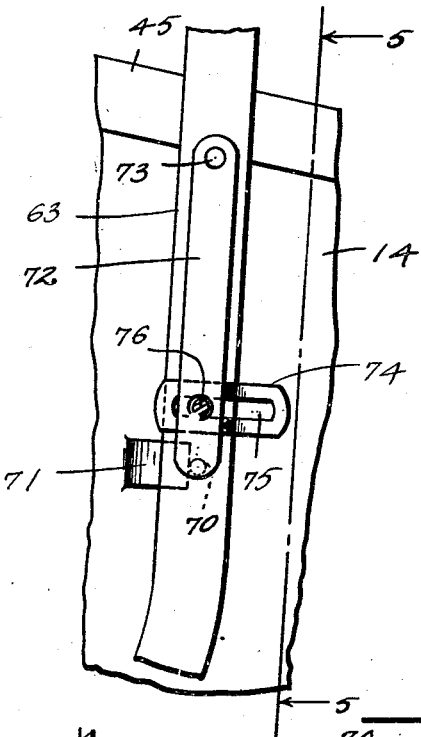
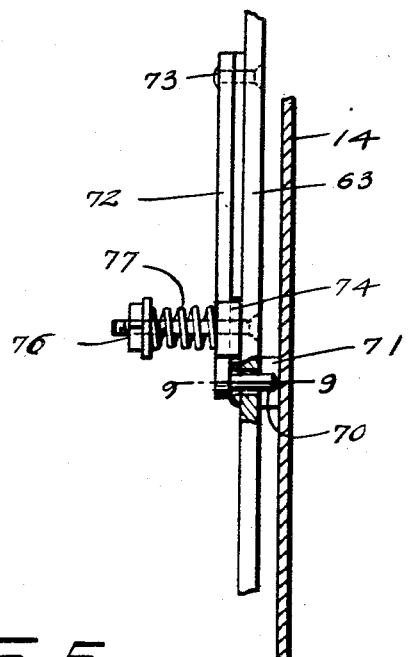
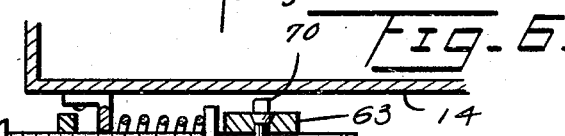
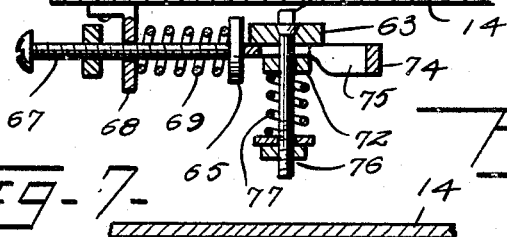
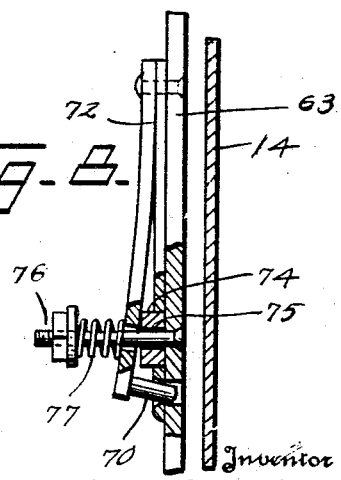
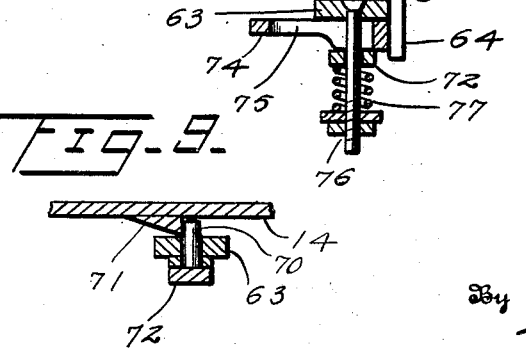
Inventor
B. A. Watt
By Watson E. Coleman
Attorney Patented Aug. 18, 1931

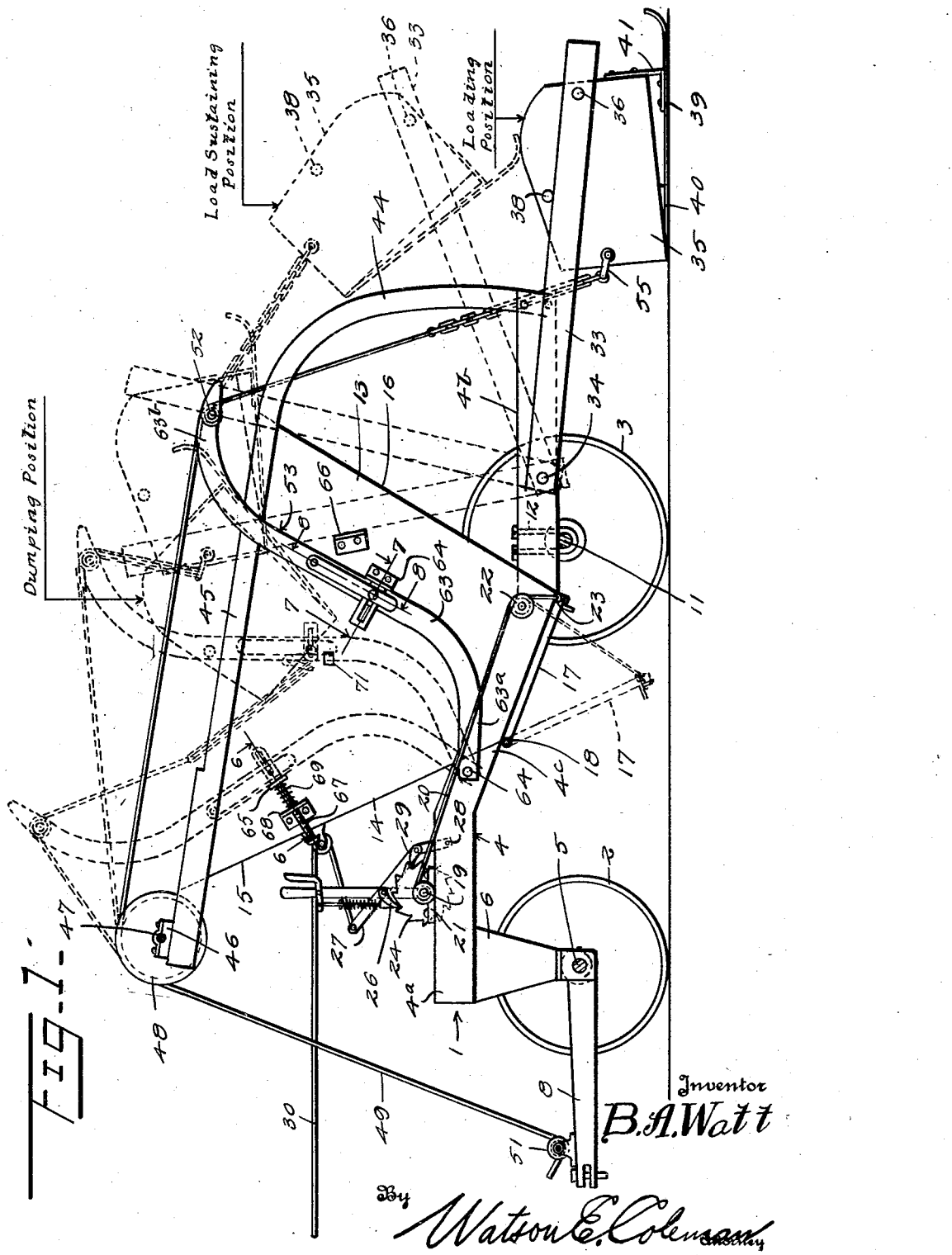

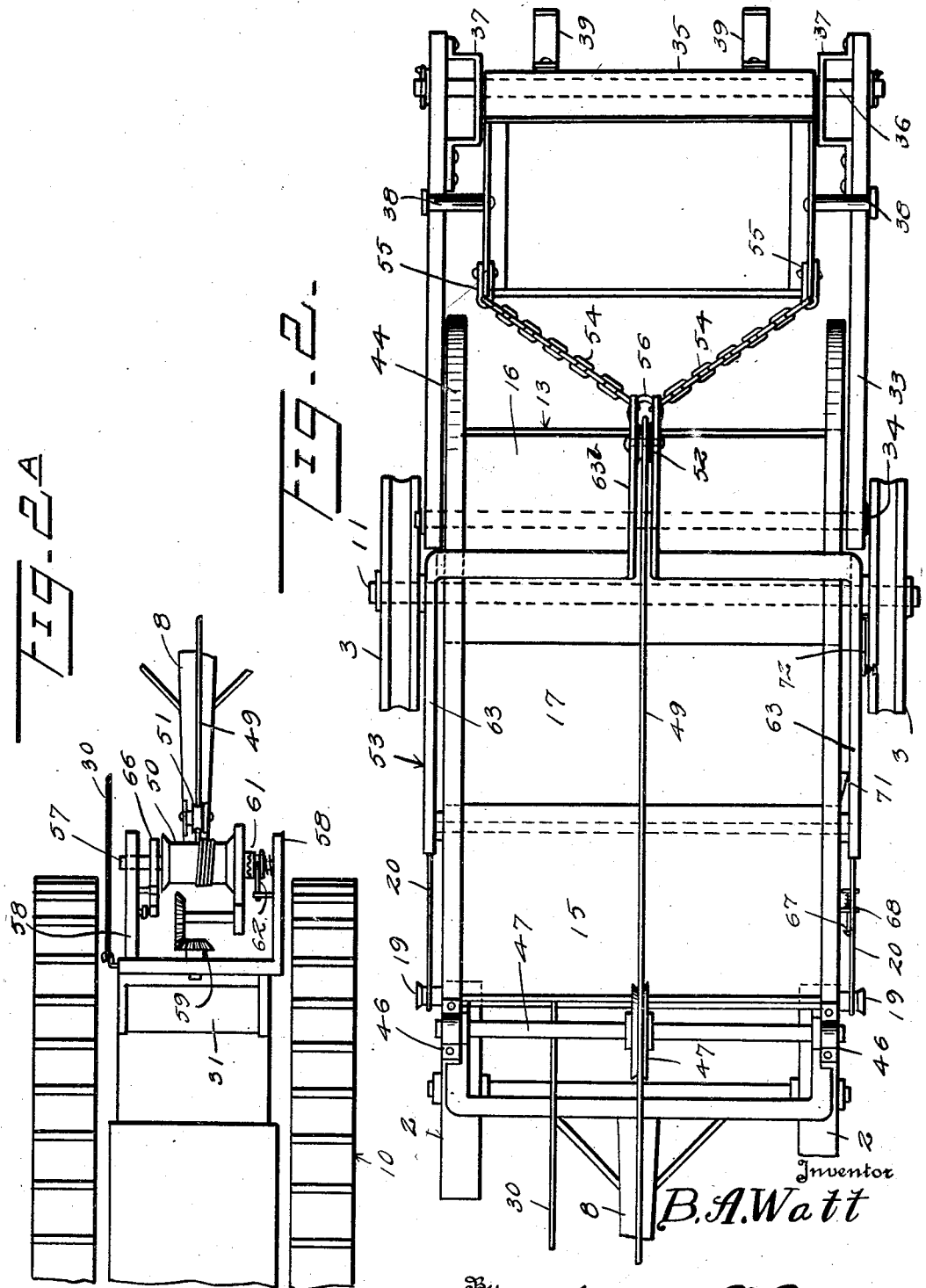

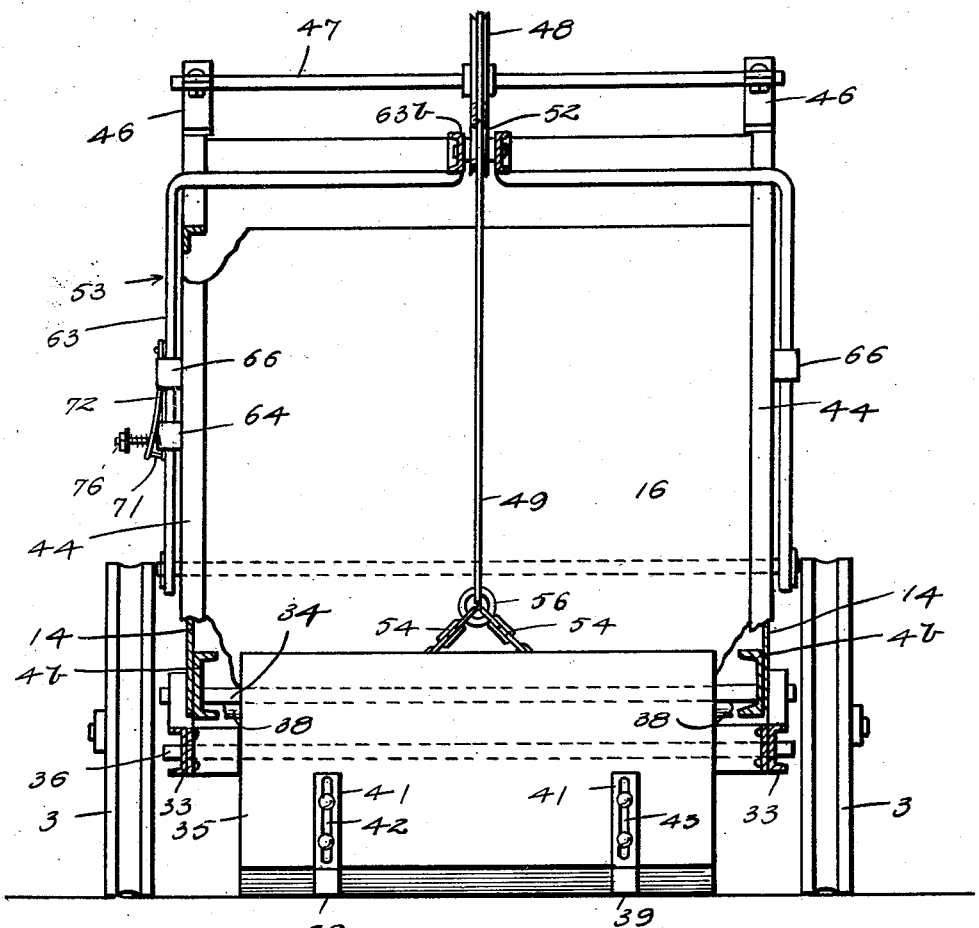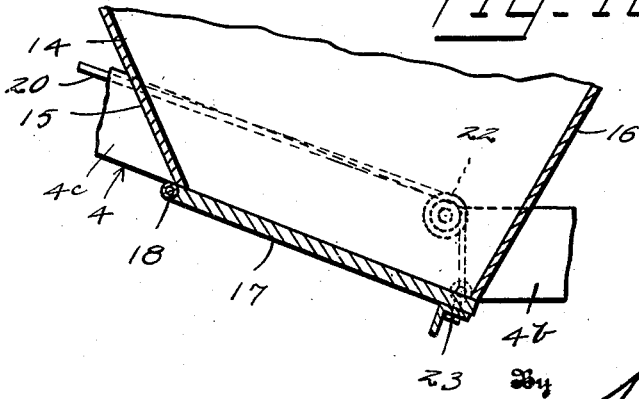

1,819,578

UNITED STATES PATENT OFFICE

BRUCE A. WATT, OF BUFFALO, WYOMING

POWER LOADING DUMP WAGON

Application filed June 28, 1930. Serial No. 464,587.

This invention relates to a power loading dump wagon, and has for one of its objects to provide a novel and highly efficient wagon of this character which shall be especially adapted for use in highway, railroad and other construction work, and which shall be adapted to reduce to the minimum the cost, labor and time involved in such work.

To attain the foregoing and other objects, the nature of which will appear as the description proceeds, the invention comprehends the provision of a wagon adapted to be drawn by a tractor and embodying a body and a scraper for loading the body with dirt, gravel or other material or materials handled in construction work of the character stated, the body having a capacity several times greater than that of the scraper to the end that the power of the tractor may be efficiently and economically employed.

The invention further comprehends the provision of a wagon wherein the body shall be provided with a dump bottom or door, and wherein the body and dump bottom or door shall be of such construction as to permit the material to be spread evenly and to any desired depth.

The invention further comprehends the provision of a wagon which shall embody dump bottom or door operating means controllable from the driver's seat of the tractor, and which shall embody scraper operating means also controllable from said seat, to the end that the tractor may be operated and the body loaded and dumped by one man.

The invention consists in the construction, combination and arrangement of parts hereinafter fully described and claimed, and illustrated in the accompanying drawings, wherein:—

Figure 1 is a view in side elevation of the power loading dump wagon;

Figure 2 is a top plan view of the power loading dump wagon;

Figure 2a is a top plan view illustrating the manner in which the power loading dump wagon is coupled to a tractor and also illustrating the means by which the scraper and dump bottom of the wagon may be controlled from the tractor;

Figure 3 is a view partly in rear elevation and partly in vertical section of the power loading dump wagon;

Figure 4 is a view partly in side elevation and partly in vertical section of the means for latching the A-frame in one of its positions;

Figure 5 is a sectional view taken on the plane indicated by the line 5—5 of Figure 4;

Figure 6 is a sectional view taken on the plane indicated by the line 6—6 of Figure 1;

Figure 7 is a sectional view taken on the plane indicated by the line 7—7 of Figure 1;

Figure 8 is a sectional view taken on the plane indicated by the line 8—8 of Figure 1;

Figure 9 is a sectional view illustrating the engagement of the latch pin with the keeper block, and Figure 10 is a view taken on a plane extending vertically and centrally through the lower portion of the body of the power loading dump wagon.

The wagon comprises a running gear 1 which consists of front wheels 2, rear wheels 3 and a frame 4. The frame 4 comprises a horizontal front portion $4^a$, a rear portion $4^b$ located in the plane below that of the front portion and a downwardly and rearwardly intermediate portion $4^c$. The frame portion $4^a$ is supported from the axle 5 and front wheels 2 by a bolster 6. The axle 5 is pivotally connected, as shown at 7, to the bolster so as to permit the front wheels 2 to be turned to effect the steering of the wagon. A draft bar 8 is secured to the axle 5, and is secured, as shown at 9, to the rear end of a tractor 10 which may be of the trackline or caterpillar type or of any other suitable type. The frame portion $4^b$ rests directly upon the axle 11 of the rear wheels 3, and is secured thereto, as shown at 12.

A body 13 is secured to and extends upwardly from the frame portion $4^c$, and comprises parallel lateral sides 14, a downwardly and rearwardly inclined front side 15 and a downwardly and forwardly inclined rear side 16. The bottom 17 of the body 13 inclines downwardly and rearwardly, and is pivoted at its front edge, as shown at 18, to permit it to swing from an open to a closed position when it is desired to dump the body. The dump bottom 17 is normally in closed position by means comprising a shaft 19 and cables 20. The shaft 19 extends across the frame portion 4ª, and is journaled in bearings 21 carried by such frame portion. The cables 20 are secured at their front ends to the shaft 19, pass over direction pulleys 22 journaled on the lateral sides 15 of the body, and are secured at their rear ends to the rear edge of the drop bottom 17, as shown at 23.

A ratchet wheel 24 fixed to the shaft 19, and a lever 25 pivoted to the shaft and provided with a spring pressed pawl 26 engaged in the ratchet wheel, provide means by which the shaft may be turned to wind the cables 20 thereon and thus effect the movement of the dump bottom 17 from its open to its closed position. A lever 27 is pivoted to the frame portion 4ª at a point rearwardly beyond the ratchet wheel 24. The lever 27 extends upwardly and forwardly from its pivot 28, and is provided near its pivot with a pawl 29 which engages the ratchet wheel 24. The lever 27 and pawl 29 provide means for holding the shaft 19 against retrograde rotation to the end that the drop bottom 17 may be held in its closed or raised position.

To permit the operator of the tractor 10 to retract the pawl 29 when it is desired to release the drop bottom 17 for movement into opened position, a cable 30 extends from the upper end of the lever 27 to the driver's seat 31 of the tractor. The cable 30 passes rearwardly from the upper end of the lever 27 to and above a direction pulley 32 journaled on the front side 15 of the body, and it then passes to the driver's seat 31, to permit the pawl 29 to be retracted when the cable is pulled forwardly. When the shaft 19 is released, the drop bottom 17 automatically moves into open position and when it is open, it occupies the downwardly and rearwardly inclined position in which it is shown by broken lines in Figure 1, and supported in this position by the cables 20. To close the drop bottom 17, it is only necessary to rock the lever 25 backwardly and forwardly, and to secure the drop bottom in closed position, it is only necessary to swing the lever 27 forwardly so as to carry the pawl 29 into engagement with the ratchet wheel 17.

Draft arms 33, which are arranged outwardly of and parallel to the lateral sides of the frame portion 4ᵇ, are pivoted at their front ends to a shaft 34 extending across said frame portion. The draft arms 33 extend rearwardly from the shaft 34 and rearwardly beyond the frame portion 4ᵇ to permit a scraper 35 to be arranged between and connected thereto. The scraper 35 faces forwardly, and is pivotally connected near its rear side and above its bottom to the rear ends of the draft arms 33 by a shaft 36. The width of the scraper 35 is less than the corresponding dimension of the body 13 and the distance between the draft arms 33, and the scraper is held centrally between the draft arms by brackets 37 which are secured to the inner sides of the rear end portions of the draft arms and contact with the ends of the scraper and through which the shaft 36 passes.

The scraper 35 is movable upwardly and downwardly with respect to the draft arms 33, and its downward movement with respect to the draft arms is limited by pins 38 which are carried by the ends of the scraper and rest upon the draft arms. The scraper 35 normally occupies a downwardly and forwardly inclined position, and it is supported in this, its loading position, by ground contacting shoes 39 which are arranged below the scraper and extend transversely of the bottom of the scraper. The shoes 39 are secured at their front ends, as at 40, to the bottom of the scraper 35, and are provided at their rear ends with upwardly directed arms 41 which are secured to the rear side of the scraper by bolts 42. The arms 41 are provided with vertical slots 43 through which the bolts 42 pass and which permit the shoes 39 to be adjusted toward and away from the bottom of the scraper 35 when it is desired to vary the inclination of the scraper.

After receiving its load, the scraper 35 is raised above the body 13 to deposit the load therein. During the raising of the scraper 35, the draft arms 33 contact with the outer sides of guides 44 which serve to hold the draft arms and scraper against lateral movement and thus insure its occupying the proper dumping position with respect to the body 13. The guides 44 curve downwardly and rearwardly from the upper rear corner of the lateral sides 14 of the body to the rear ends of the frame portion 4ᵇ, and constitute extensions of reinforcing bars 45 for the upper edges of said sides of the body. The reinforcing bars 45 extend forwardly beyond the body 13 and are provided at their front ends with bearings 46 in which is journaled a shaft 47. A groove pulley 48 is fixed to the shaft 47 in alinement with the longitudinal center of the body 13, and passing over this pulley is a cable 49 which is secured at its front end to a drum 50 carried by the tractor 10. The cable 49 passes under a direction pulley 51 journaled upon the draft bar 8, and passes over a direction pulley 52 journaled in the upper end of an A-frame or lever 53. A crotch chain 54 is secured, as shown at 55, to the front edges of the ends of the scraper 35 and is secured through the medium of a ring 56 to the rear end of the cable 49. The cable 49, drum 50, frame 53 and crotch chain 55 constitute means through the medium of which the scraper 35 may be moved from its loading to its dumping position.

The drum 50 is loosely mounted upon a shaft 57 which is journaled in bearing brackets 58 extending rearwardly from the tractor seat 31. The shaft 57 is driven from the power takeoff shaft 59 of the tractor 10 by a train of gearing 60. A clutch 61, having its control lever 62 within convenient reach of the driver of the tractor 10, provides means by which the driver may engage the drum 50 with the shaft 57 when he wishes to raise the scraper 35 into dumping position.

The A-frame 53 embodies side bars 63 which normally occupy an upwardly and rearwardly inclined position outwardly of the lateral sides 14 of the body and have forwardly directed lower ends 63$^a$ and rearwardly directed upper ends 63$^b$. The bars 63 are pivotally connected at their lower ends, as at 64, to the frame portion 4$^c$, at a point forwardly beyond the vertical center of the body 13. The upper ends 63$^b$ of the bars 63 are located at the longitudinal center of the body 13, and the pulley 52 is journaled to and between these bar ends.

The A-frame 53 is mounted for forward and rearward swinging movement with respect to the body 13. A stop 64 limits the rearward movement of the A-frame 53, and a stop 65 limits the forward movement of the frame, the stops being carried by one of the lateral sides 14 of the body and being positioned for contact by that frame bar 63 located opposite such side of the body.

During the loading of the scraper 35, the A-frame occupies the upwardly and rearwardly inclined position in which it is shown in Figure 1, and it is supported in this position by the stop 64. After the scraper 35 has been loaded, the clutch 61 is thrown in to effect the winding of the cable 49 upon the drum 50. During the initial phase of the winding of the cable 49 upon the drum 50, the scraper 35 is swung upwardly and rearwardly on its pivot 36 into the load sustaining position in which it is shown by broken lines in Figure 1, and at the same time the arms 33 are swung upwardly and forwardly with respect to the A-frame 53. As the pulley 52 is located rearwardly beyond the pivot 64 of the A-frame when the frame is in its upwardly and rearwardly inclined position, the force applied to the pulley, during the raising of the scraper 35 into its load sustaining position, holds the A-frame against forward movement. When the scraper 35 reaches its load sustaining position, the ring 56 engages the upper end of the A-frame 53 with the result that the movement of the draft arms 33 with respect to the A-frame is arrested, the scraper is supported in its load sustaining position and the draft arms and A-frame move in unison until the scraper reaches a position above the body 13. When the scraper 35 reaches this position, the draft arms 33 contact with stops 66 which are carried by the lateral sides 14 of the body. The stop 65 arrests the motion of the draft arms 33 and support them in a position inclined slightly forward with respect to the vertical. The cable 49 is now slightly slacked to permit the scraper 35 to gravitate into the dumping position in which it is shown by broken lines in Figure 1.

During the movement of the scraper 35 into dumping position, the cable 49 exerts a forwardly directed force against the pulley 52, with the result that the A-frame 53 is swung forwardly into contact with the stop 65 to move its upper end out of the path of the scraper and thus permit it to move freely into dumping position. The stop 65 is carried by a headed rod 67 which is slidably mounted in a bracket 68 secured to the body. A coil spring 69 is mounted upon the rod 67 between the stop 65 and the bracket 68, and is placed under tension when the A-frame 53 is swung into contact with the stop.

After the scraper 35 reaches its dumping position, the rearward pressure against the A-frame pulley 53 is removed, and the spring 69 reacts and swings the A-frame rearwardly. The A-frame continues moving in this direction until its upper end contacts with the scraper 35, and it is locked in this position against forward movement by a latch pin 70 carried by that scraper bar 63 moving between the stops 64 and 65 and engaging a keeper block 71 secured to the body between the stops. To return the scraper 35 to its loading position, the clutch 61 is manipulated to effect the slow winding of the cable 49 upon the drum 50, with the result that the scraper is raised from its downwardly inclined dumping position into a horizontal position. During this movement of the scraper 35, the front side of the scraper contacts with the upper end of the A-frame 53. As the A-frame 53 is latched against forward movement, the contact between the scraper 35 and A-frame will move the draft arms 33 rearwardly beyond the vertical, so as to permit them and the scraper to gravitate downwardly and thus arrange the scraper in loading position.

The rate of movement of the scraper 35 into loading position may be regulated by the brake 66 associated with the drum. During the movement of the scraper 35 into loading position, the A-frame 53 moves into its upwardly and rearwardly inclined position against the stop 64, so as to permit the scraper 35 to be again raised into load sustaining position, then moved into position above the body 13, then lowered into dumping position, and thereafter returned to loading position.

The latch pin 70 is carried by one end of a leaf spring 72 which is secured at its other end, as at 73, to the A-frame bar 63 through which the pin passes. A wedge 74 is arranged between the bar 63 and spring 72, and is provided with a longitudinal slot 75 through which passes a bolt 76 carried by said bar and passing through an opening in the spring 72. The wedge 74 is adapted to occupy an active and an inactive position. When the wedge 74 is in active position, the latch pin 70 is retracted, and when the wedge is in inactive position, the latch pin is projected. The latch pin 70 is constantly urged in the direction of its active position by a coil spring 77 mounted in the bolt 76 and bearing against the spring 72. A filler 78 is positioned between the spring 72 and the frame bar 63 to which the spring is secured, and is held in place by the parts 70 and 73. The wedge 74 is adapted to be moved into active position by the stop 64, and it remains in this position until the A-frame 53 is in contact with the stop 65, so as to enable the A-frame to pass the keeper block 71 during the forward movement of the frame. The wedge 74 is adapted to be moved into inactive position by the stop 65 so as to permit the latch pin 70 to engage the keeper block during the rearward movement of the A-frame 53 and when the upper end of the A-frame 53 contacts with the scraper 35, the latch pin, as hereinbefore stated, holding the A-frame against forward movement so as to effect the swinging of the draft arms 33 rearwardly beyond the vertical and thus enable the scraper to return to dumping position.

From the foregoing description, taken in connection with the accompanying drawings, it should be apparent that one man may operate the tractor, control the scraper to effect the loading and dumping thereof, and control the dump bottom or door to effect the dumping of the body and the spreading of the material therein. It should also be understood that the means for operating the scraper and the means for operating the drop bottom or door are simple and easily controllable by the tractor operator. It should still further be understood that as the capacity of the body is several times greater than that of the scraper the power of the tractor is economically and efficiently employed. After the body has been filled, the scraper is returned to loading position and after it has been loaded, it is raised into load sustaining position. After the drop bottom or door has been lowered to the desired extent, the scraper is moved into dumping position so as to permit its load to pass through the discharge opening of the body.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

1. A machine of the character set forth, comprising a running gear, a body carried by the running gear, draft arms pivoted to and extending rearwardly from the rear end of the running gear, a forwardly facing scraper arranged between the rear ends of the draft arms and pivoted near its rear side to said ends of the draft arms, the scraper normally occupying a downwardly and forwardly inclined loading position, a frame straddling the body and pivoted at its lower end to the running gear, the frame normally occupying an upwardly and rearwardly inclined position, means supporting the frame in said position, a pulley carried by the upper end of the frame, a cable passing over the pulley and secured to the front side of the scraper and adapted to permit the scraper to be first raised into an upwardly inclined load sustaining position and to permit it to be thereafter raised into a position above the body and thereafter lowered into dumping position, the draft arms assuming a position forwardly beyond the vertical when the scraper is in a position above the body, means supporting the draft arms in this position, and means carried by the cable and engaging the frame to swing it forwardly during the movement of the scraper above the body.

2. A machine of the character set forth, comprising a running gear, a body carried by the running gear, draft arms pivoted to and extending rearwardly from the rear end of the running gear, a forwardly facing scraper arranged between the rear ends of the draft arms and pivoted near its rear side to said ends of the draft arms, the scraper normally occupying a downwardly and forwardly inclined loading position, a frame straddling the body and pivoted at its lower end to the running gear, the frame normally occupying an upwardly and rearwardly inclined position, means supporting the frame in said position, a pulley carried by the upper end of the frame, a cable passing over the pulley and secured to the front side of the scraper and adapted to permit the scraper to be first raised into an upwardly inclined load sustaining position and to permit it to be thereafter raised into a position above the body and thereafter lowered into dumping position, the draft arms assuming a position forwardly beyond the vertical when the scraper is in a position above the body, means supporting the draft arms in this position, means carried by the cable and engaging the frame to swing it forwardly during the movement of the scraper above the body, the frame moving forwardly during the movement of the scraper into dumping position, means for moving the frame rearwardly into contact with the scraper after the movement of the latter into dumping position, and means holding the frame against rearward movement from this position.

3. A machine of the character set forth, including a body, pivoted draft arms extending rearwardly of the body, a forwardly facing scraper rockably connected to the draft arms and normally occupying a downwardly and forwardly inclined loading position, means connected to the scraper and operable to swing the scraper on the draft arms into an upwardly and forwardly inclined load sustaining position and then swing the draft arms upwardly and forwardly to carry the scraper in this position above the body, and means for stopping the movement of the draft arms when the scraper is above the body, said first means being operable to release the scraper after the draft arms have been stopped, and the draft arms supporting the scraper when released for downward swinging movement into dumping position.

4. A machine of the character set forth, including a body, pivoted draft arms extending rearwardly of the body, a forwardly facing scraper rockably connected to the draft arms and normally occupying a downwardly and forwardly inclined loading position, a flexible pull member connected to the scraper, means for guiding the flexible member to cause the pulling thereof to swing the scraper on the draft arms into an upwardly and forwardly inclined load sustaining position and then swing the draft arms upwardly and forwardly to carry the scraper in this position above the body, and means for stopping the movement of the draft arms when the scraper is above the body to support the scraper for downward swinging movement into dumping position when the flexible member is released.

5. A machine of the character set forth, including a body, pivoted draft arms extending rearwardly from the body, a forwardly facing scraper rockably connected to the draft arms and normally occupying a downwardly and forwardly inclined loading position, a flexible pull member connected to the scraper, means for guiding the flexible member to cause the pulling thereof to swing the scraper on the draft arms into an upwardly and forwardly inclined load sustaining position and then swing the draft arms upwardly and forwardly to carry the scraper in this position above the body, means supporting said guiding means at the rear side of the body and movable to carry it forwardly from said position, means adapted to move said supporting means forwardly during the swinging of the draft arms, and means for stopping the movement of the draft arms when the scraper is above the body to support the scraper for downward swinging movement into dumping position when the flexible member is released.

6. A machine of the character set forth, including a body, pivoted draft arms extending rearwardly of the body, a forwardly facing scraper rockably connected to the draft arms and normally occupying a downwardly and forwardly inclined loading position, a flexible pull member connected to the scraper, means for guiding the flexible member to cause the pulling thereof to rock the scraper on the draft arms into an upwardly and forwardly inclined load sustaining position and then swing the draft arms upwardly and forwardly to carry the scraper in this position above the body, means for stopping the movement of the draft arms when they move forwardly beyond the vertical to support the scraper for downward swinging movement into dumping position when the flexible member is released, means supporting the guiding means at the rear side of the body and movable to carry the guiding means forwardly from this position, means adapted to move said supporting means forwardly during the swinging of the draft arms, means for moving said supporting means rearwardly after the scraper has swung into dumping position, said supporting means contacting with the scraper and supporting said guiding means in a position to cause the flexible member when again pulled to move the scraper upwardly against said supporting means, the movement of the scraper against said supporting means swinging the draft arms rearwardly beyond the vertical, and means for holding said supporting means against forward movement during this actuation of the scraper to effect the rearward movement of the draft arms.

In testimony whereof I hereunto affix my signature.

BRUCE A. WATT.